Nov. 25, 1941.  C. J. GRAY  2,263,556
HOP PICKING MACHINE
Filed Aug. 9, 1939  2 Sheets-Sheet 1

Inventor
Charles John Gray
By Mock & Blum
Attys.

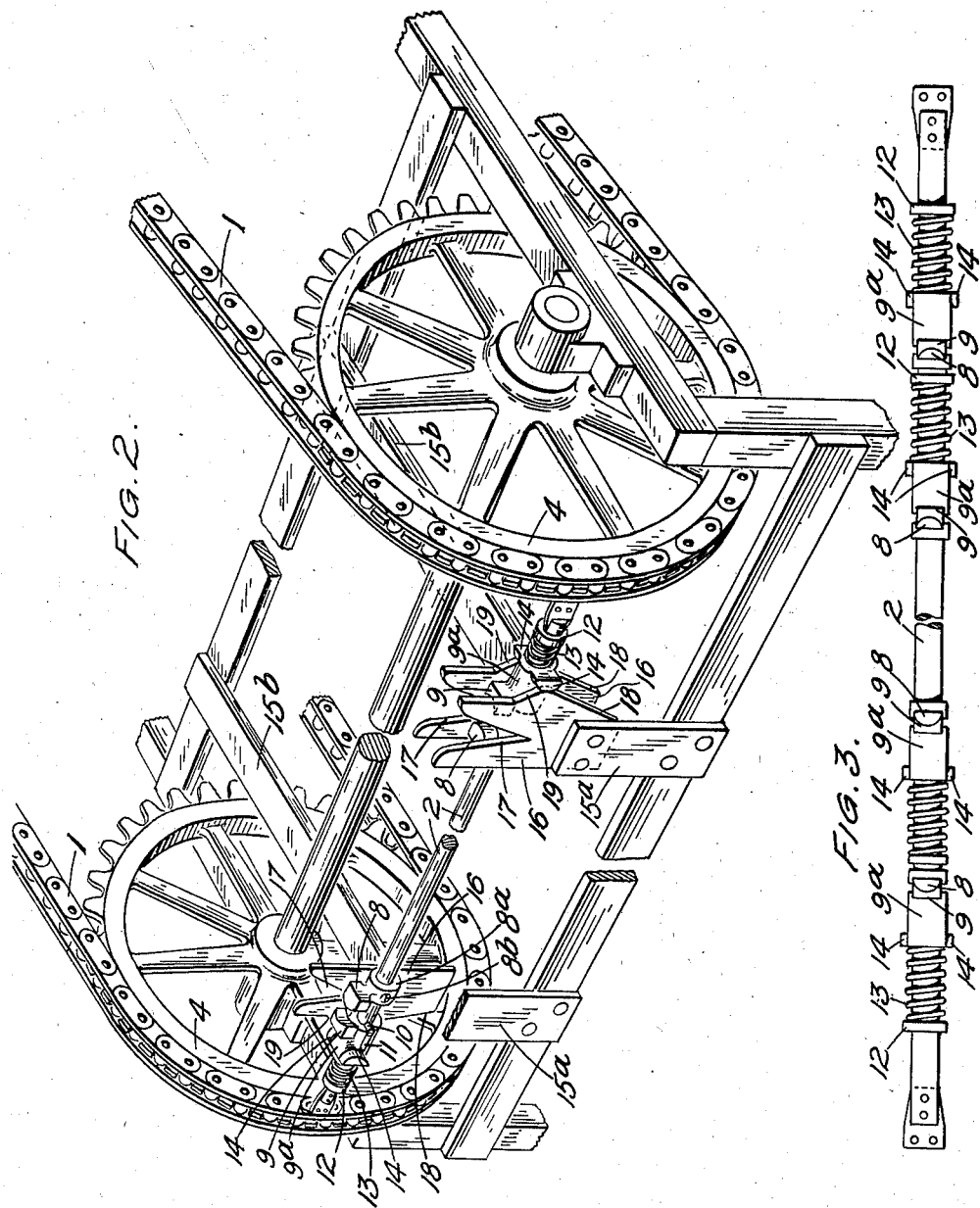

Patented Nov. 25, 1941

2,263,556

UNITED STATES PATENT OFFICE 2,263,556

HOP PICKING MACHINE

Charles John Gray, Pinner, England, assignor to Arthur Guinness Son & Company Limited, London, England Application August 9, 1939, Serial No. 289,135
In Great Britain August 20, 1938

2 Claims. (Cl. 130—30)

The present invention relates to hop picking machines of the kind in which the bine, after having been cut from the plant, is carried upon an endless conveyor which draws it lengthwise past one or more series of moving projections or picker fingers carried upon rotating drums, chains or the like, and which are designed to engage the hops and pull them from the short stalks or stems by which they are attached to the bine.

It has been proposed to provide the conveyor with gripping means comprising a pivoted jaw member arranged to grip the bine as a result of tension along the latter produced by the pulling action of the conveyor, and this has been subject to the disadvantage that, in addition to having to manually present the bine to this gripping means, it has been necessary for the operative to open or ascertain whether such means is open to receive the bine, and then either manually close said gripping means or ensure that sufficient initial tension is on the bine for this to be effected.

The object of the present invention is to avoid these disadvantages.

According to the present invention, the conveyor is provided with jaws for automatically gripping the bines, and arranged to open and close, by relative rectilinear movement transversely to the line of movement of the conveyor, means also being provided for opening the jaws to release stripped bines and then positively maintaining said jaws open to receive a further bine.

Preferably means is provided for receiving the butt ends of the bines in readiness for them to be gripped by the jaws, such means preferably being so positioned and arranged that, as soon as the jaws grip each bine, the latter moves clear of said receiving means and leaves same free to receive the butt end of another bine in readiness for it to be gripped by the succeeding pair of jaws.

The jaws may be spring loaded to maintain them closed, in which case, a fixed cam plate can be disposed at the entrant end of the machine and arranged in the path in which the jaws are carried by the conveyor, to engage and force them apart for sufficient time to receive the end of the bine, the jaws closing upon and gripping the bine end upon moving clear of the cam plate.

The invention will now be described, by way of example, with reference to the accompanying drawings, in which:

Fig. 2 is a perspective detail view of the entrant end of the machine showing the manner in which the jaws are opened by the cam plates.

Fig. 3 is a plan of one of the conveyor parts on which the jaws are carried.

Figure 1:
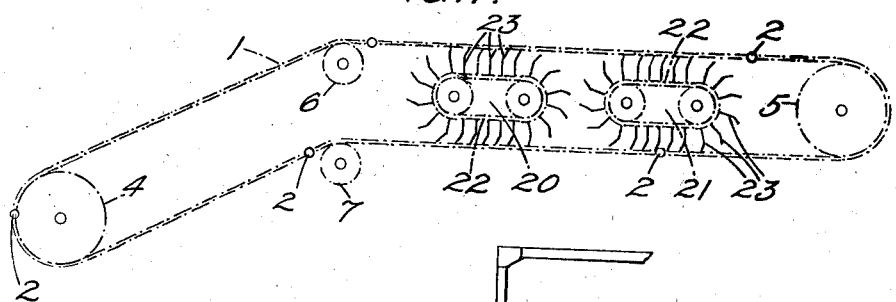
Fig. 1 is a diagrammatic longitudinal sectional view of a machine to which the present invention is applicable.

Referring to Figs. 1 and 2 of the accompanying drawings, the machine comprises a conveyor having a pair of spaced apart parallel chains 1, 1, between which are carried a series of transverse bars 2, spaced at equal distances of thirteen or sixteen feet apart, according to the length of the bines, each of the chains being carried upon suitably driven sprocket wheels 4, 5, and rollers 6, 7.

As shown in Figs. 2 and 3, each pair of jaws comprises a male member 8, and a female member 9, the male member 8 being formed integral with a collar 8a fixed upon the bar 2 by a set screw 8b.

The female members 9 are formed integral with sleeves 9a slidingly mounted upon the bars 2.

Pins, such as 10 are provided in the bars, each of which pins engages with a slot 11 formed in its appropriate sleeve 9a, to thus prevent this sleeve from turning, but, at the same time, permit it to move axially.

There are four pairs of jaws upon each of the rods 2, as shown in Fig. 3.

In partial compression between the outer end of each sleeve 9a and a collar 12 upon each of the rods 2 is a helical spring 13, the action of which is to normally maintain the female jaw member 9 closed up against the male member 8.

Formed integral with the rear end of each of the sleeves 9a are cams 14, 14, having arcuate faces.

Mounted, by means of brackets 15a, 15b, upon the frame 15, so as to be one upon the outside and one upon the inside of the path of movement of the rods 2 as the parts of the chains 1 carrying them pass round the sprocket wheels 4, 4, at the entrant end of the machine, are pairs of parallel plates 16 having V-shaped slots 17 formed in their upper edges, each of the plates having at one side an edge portion 18 which inclines outwardly in an upward direction from the bottom of the plate, and terminates at the lower end of an inwardly and upwardly inclined edge portion 19.

The arrangement just described is such that as the conveyor moves in a clockwise direction, the cams 14 ride up the edge portions 18 of the plates 16, and cause the female jaw members 9 to be moved, against the action of the springs 13, away from the male jaw members 8, or, in other words, cause the jaws to open.

When the cams 14 travel along the inwardly inclined edge portions 19 of the plates 16, the female jaw members 9 move, under the action of the springs 13, into engagement again with the male jaw members 8.

By, however, previously placing the butt end of a bine in the V-slots of each pair of plates 16 so that it bridges the pair of plates, the jaws, when they close, as just described, will close upon and tightly grip the bine ends, and pull the bines over, then under, picking units such as indicated by 20 and 21, in Fig. 1, and comprising assemblies, driven in any suitable manner, the chains 22 of which carry fingers 23, which engage the hops and pull them from the oppositely moving bines.

The hop stripped bines are carried round on the lower run of the conveyor until the jaws are caused to again open, in the manner already described, the cams 14 and plates 16 being so arranged that such opening shall take place well in time for the stripped bines to be pulled by rubber rollers (not shown), or any other suitable means, from the conveyor, in time for a fresh bine to be gripped by the jaws.

Preferably the effective faces of each pair of jaws, 8, 9, are roughened or otherwise treated to prevent the bine slipping when it is gripped by them.

Figure 4:
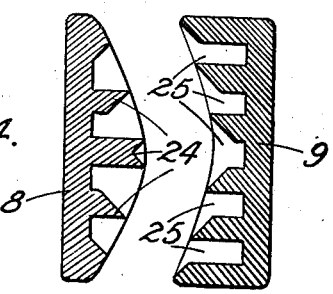
Fig. 4 is a section showing, in the open condition, a construction of jaw members designed to efficiently grip and hold the bine ends.

In the sectional plan view in Fig. 4 is shown an effective non-slipping jaw construction in which the effective portions of the jaws constitute projections 24 on the male member 8, and cavities 25 in the face of the female member 9, with which cavities the projections 24 are designed to co-operate in gripping the bine end.

Figure 5:
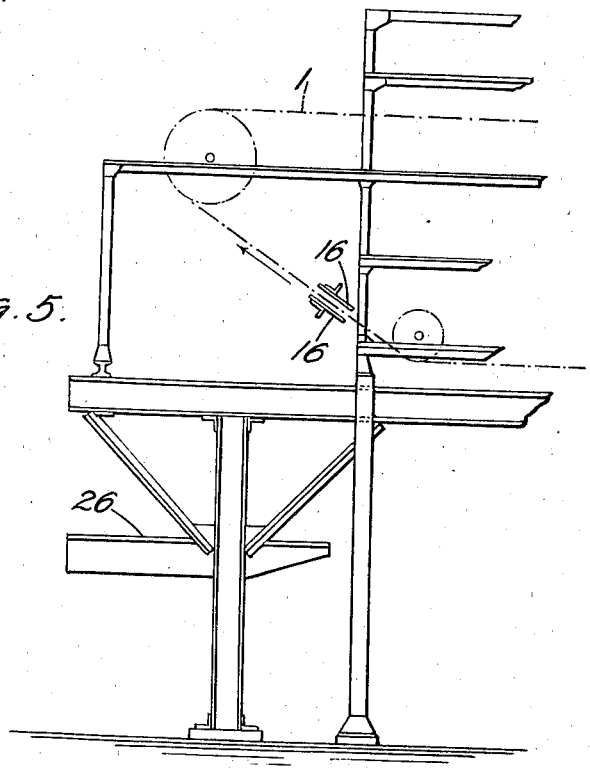
Fig. 5 is a diagrammatic view of part of a conveyor which permits the jaw opening and closing means to be placed in a position in which the putting of the bines in position to be gripped by the jaws is greatly facilitated.

In cases where the conveyor at the bine receiving end of the machine is arranged as shown in Fig. 5, the plates 16 are preferably disposed near the lower end of the upwardly inclined portion of the conveyor, so that, as soon as the jaws have gripped the butt end of each bine, the bine is lifted sufficiently clear of the plates to leave the latter free to have the butt end of another bine placed across them in readiness to be gripped by the succeeding pair of jaws.

Preferably a platform such as 26 is provided, on which the bines are laid in readiness for having their butt ends placed across the plates.

I claim:

1. In a hop picking machine of the kind having a conveyor by which the bines are drawn over series of picking fingers for detaching the hops and in which said conveyor consists of a pair of flexible members arranged in spaced parallel relationship, and rigid bars arranged at right angles to and carried between said flexible members and spaced at intervals therealong, in combination, means for gripping said bines comprising a pair of jaws relatively slidable on said bars, resilient means normally maintaining said jaws closed upon a bine to pull same through the machine, and stationary cam plates for opening said jaws against said resilient means at a certain point in the path of travel of the conveyor, for a sufficient time to both release the stripped bine and to permit said jaws to receive an unstripped bine, together with a fixed support upon which the butt ends of the bines can be rested, said support comprising a pair of members parallel to the path of travel of the gripping jaws, said members each having a substantial valley formed in the top edge thereof, the bottom of said valleys being positioned at that point where the gripping jaws are in separated position whereby the end of a bine supported between said valleys will be in the path of the open jaws.

2. In a hop picking machine of the kind having a conveyor by which the bines are drawn over series of picking fingers for detaching the hops and in which said conveyor consists of a pair of flexible members arranged in spaced parallel relationship, and rigid bars arranged at right angles to and carried between said flexible members and spaced at intervals therealong, in combination, means for gripping said bines comprising a pair of jaws relatively slidable on said bars, resilient means normally maintaining said jaws closed upon a bine to pull same through the machine, and stationary plates substantially parallel to the path of travel of said jaws, each of said plates having one of their sides cammed, said cammed surface being so positioned as to engage one of the slidable jaws and separate it from its mate, each of said plates having a valley formed in its top edge, the bottom of said valley being substantially level with the apex of the cammed surface of said plate, and being adapted to receive the end of a bine and interpose the same in the path of travel of the open jaws.

CHARLES JOHN GRAY.